(12) United States Patent
Sanvido et al.

(10) Patent No.: US 8,599,507 B2
(45) Date of Patent: Dec. 3, 2013

(54) DISTRIBUTED FIELD SELF-TEST FOR SHINGLED MAGNETIC RECORDING DRIVES

(75) Inventors: Marco Sanvido, Belmont, CA (US); Zvonimir Bandic, San Jose, CA (US); Yuval Cassuto, Kiryat Ono (IL); Jorge Campello De Souza, Sunnyvale, CA (US); Cyril Guyot, San Jose, CA (US); Tomohiro Harayama, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 177 days.

(21) Appl. No.: 13/312,979

(22) Filed: Dec. 6, 2011

(65) Prior Publication Data

US 2013/0142024 A1    Jun. 6, 2013

(51) Int. Cl.
*G11B 27/36* (2006.01)
*G11B 5/09* (2006.01)

(52) U.S. Cl.
USPC .............................................. 360/31; 360/48

(58) Field of Classification Search
None
See application file for complete search history.

(56) References Cited

U.S. PATENT DOCUMENTS

| | | |
|---|---|---|
| 6,185,063 B1 | 2/2001 | Cameron |
| 6,378,037 B1 | 4/2002 | Hall |
| 6,967,810 B2 | 11/2005 | Kasiraj |
| 7,603,530 B1 | 10/2009 | Liikanen et al. |
| 2005/0071537 A1 | 3/2005 | New |
| 2007/0183071 A1 | 8/2007 | Uemura |
| 2010/0205623 A1 | 8/2010 | Molaro |
| 2010/0232057 A1 | 9/2010 | Sanvido |
| 2011/0058277 A1 | 3/2011 | de la Fuente et al. |

OTHER PUBLICATIONS

Yuval Cassuto, et al.; Indirection Systems for Shingled-Recording Disk Drives; 26th IEEE (MSST2010) Symposium on Massive Storage Systems and Technologies; May 7, 2010 http://storageconference.org/2010/Presentations/Research/15.Cassuto.pdf 44 pages.

Ikuya Tagawa, et al.; Minimization of erase-band in shingled PMR with asymmetric writer; Journal of Magnetism and Magnetic Materials; No vol. or page given; online Dec. 2, 2010 in ScienceDirect. 3 pages.

Ahmed Amer, et al.; Design Issues for a Shingled Write Disk System; 26th IEEE (MSST 2010) Symposium on Massive Storage Systems and Technologies: Research Track; May 7, 2010 http://storageconference.org/2010/Papers/MSST/Amer.pdf . 12 pages.

*Primary Examiner* — Regina N Holder
(74) *Attorney, Agent, or Firm* — G. Marlin Knight

(57) ABSTRACT

A method is described for allowing disk drives, such as shingle-written magnetic recording (SMR) drives, to be shipped for customer use with portions of the magnetic media being left untested. The testing is then completed by the drive self-testing in the field. The drive is made functional at the factory by fully testing at least one operational set of regions including an I-region, an E-region and a write cache region. The operational set of regions works as a separate self-contained virtual disk drive and can be used immediately. The remaining untested areas on the media can be tested in the field by a background task and/or when the first write command is received that requires a new track or operational set of regions (on-the fly testing).

19 Claims, 2 Drawing Sheets

DISTRIBUTED FIELD SELF-TEST FOR SHINGLED MAGNETIC RECORDING DRIVES

RELATED APPLICATIONS

A commonly assigned patent application filed on Jul. 18, 2011 bearing Ser. No. 13/135,953, which is hereby incorporated by reference, describes SMR drive embodiments with write-twice cache regions that are mentioned in the present application.

FIELD OF THE INVENTION

The invention relates to the field of data storage device architecture using distributed self-testing for defect mapping in shingle-written magnetic recording (SMR) devices.

BACKGROUND

Conventional disk drives with magnetic media organize data in concentric tracks that are spaced apart. The concept of shingled writing is a form of perpendicular magnetic recording and has been proposed as a way of increasing the areal density of magnetic recording. In shingle-written magnetic recording (SMR) media a region (band) of adjacent tracks are written so as to overlap one or more previously written tracks. The shingled tracks must be written in sequence unlike conventionally separated tracks, which can be written in any order. The tracks on a disk surface are organized into a plurality of shingled regions (I-regions) which can be written sequentially from an inner diameter (ID) to an outer diameter (OD) or from OD to ID. The number of tracks shingled together in a region is a key performance parameter of shingled-writing. Once written in shingled structure, an individual track cannot be updated in place, because that would overwrite and destroy the data in the overlapping tracks. Shingle-written data tracks, therefore, from the user's viewpoint are sometimes thought of like append-only logs. To improve the performance of SMR drives, a portion of the media is allocated to a so-called "exception region" (E-region) which is used as a staging area for data which will ultimately be written to an I-region. The E-region is sometimes referred to as an E-cache.

Address indirection in the shingle-written storage device's internal architecture is useful to emulate existing host interfaces at least to some extent and shield the host from the complexities associated with SMR. Conventionally host file systems use logical block addresses (LBAs) in commands to read and write blocks of data without regard for actual locations (physical block addresses (PBAs)) used internally by the storage device. Hard disk drives have had some level of LBA-PBA indirection for decades that, among other things, allows bad sectors on the disk to be remapped to good sectors that have been reserved for this purpose. Address indirection is typically implemented in the controller portion of the drive's architecture. The controller translates the LBAs in host commands to an internal physical address.

The conventional LBA-PBA mapping for defects does not need to be changed often. In contrast, in an SMR device the physical block address (PBA) of a logical block address (LBA) can change frequently depending on write-history. For example, background processes such as defragmentation move data sectors from one PBA to another but the LBA stays the same. The indirection system for SMR is a natively dynamic system which translates host address requests to physical locations. In an SMR system, the LBA-PBA mapping can change with every write operation because the system dynamically determines the physical location on the media where the host data for an LBA will be written. The data for the same LBA will be written to a different location the next time the host LBA is updated. The indirection system provides a dynamic translation layer between host LBAs and the current physical locations on the media.

U.S. Pat. No. 7,603,530 to Liikanen, et al. (Oct. 13, 2009) describes methods for dynamic multiple indirections in a dynamically mapped mass storage device. The method provides for dynamically altering the number of replicated copies (multiple mapped indirections) of user data stored on the storage device. Increased multiple indirections are said to improve reliability by decreasing the probability of data loss in response to various failure modes of the storage device. Strategic physical placement of the multiple copies (multiple indirections) may improve performance by reducing latencies associated with accessing the user data. Additional copies (multiple indirections) of stored user data may be written to the mapped storage device if degrading reliability is detected. The mapping technique is said to allow embodiments that assure a sequential order of adjacent track writes which in turn allows the tracks to be more closely spaced because unwritten tracks ahead of the current track position will not contain data that must be retained. The mapping feature obviates the need for gaps between adjacent tracks and allows sequentially written tracks to overlap the outermost portion of the earlier written track.

SUMMARY OF THE INVENTION

Embodiments of the invention allow disk drives, such as shingle-written magnetic recording (SMR) drives, to be shipped for customer use with portions of the magnetic media being left untested. The testing is then completed by the drive self-testing in the field. Distributing a substantial portion of the required testing to the drive in the field, reduces manufacturing testing time and reduces costs without significantly increasing field failures.

The drive is made functional at the factory by fully testing at least one operational set of regions including an I-region, an E-region and a write cache region. The operational set of regions works as a separate self-contained virtual disk drive and can be used immediately. The remaining untested areas on the media can be tested in the field by a background task and/or when the first write command is received that requires a new track or operational set of regions (on-the fly testing). Alternative embodiments include allowing new writes to be written to an E-region that would otherwise require on-the fly testing of the target track. Another embodiment selectively enables a sequential bypass parameter for selected I-regions that allows a new sequential write to diverted to a previously tested I-track in another region instead of requiring on-the fly testing.

DETAILED DESCRIPTION OF THE INVENTION

As used herein, a region is a set of contiguous concentric magnetic tracks in generally homogeneous thin film magnetic media on a disk surface. I-regions are shingled user-data areas. An E-region is an exception region that generally includes data that is being staged or cached before being written to I-region. E-regions and I-regions are used according to general SMR principles except as described herein. E-regions can be shingled or non-shingled and there can be one or more per disk-media surface. The E-regions temporarily include updated LBAs that were previously written in sequential shingled I-regions and could not be overwritten in place. The old sectors in I-regions become virtual holes that are eventually recovered by the defragmentation process. Alternative embodiments of the invention include allowing new writes to be written to an E-region that would otherwise require on-the fly testing of the target track.

Figure 1:
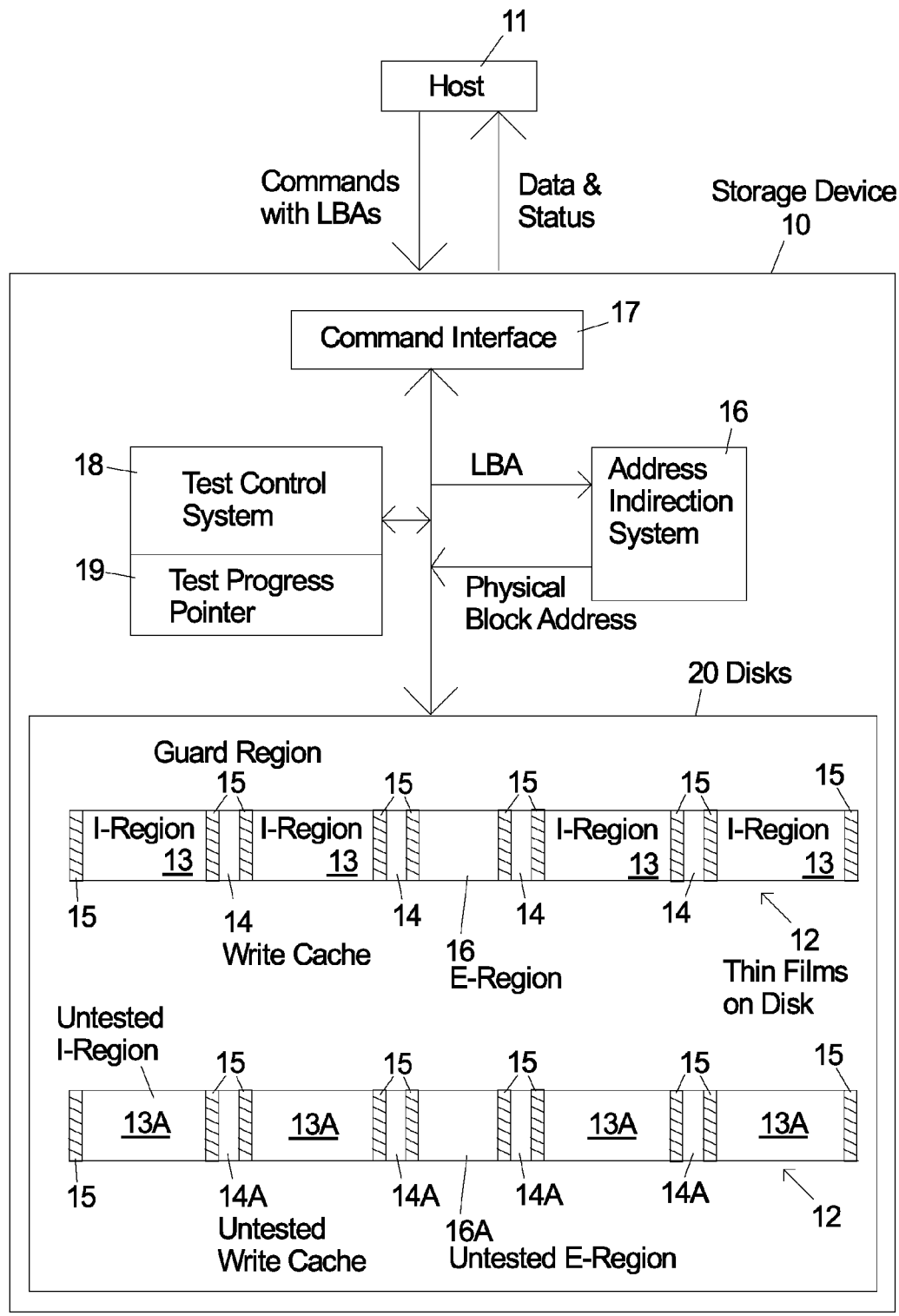
FIG. 1 is an illustration of a data storage device with a Test Control System according to an embodiment of the invention at a selected stage after initial factory testing.

FIG. 1 is an illustration of a data storage device (DSD) 10 using SMR with a Test Control System 18 according to an embodiment of the invention at a selected stage after initial factory testing has been performed. The data storage device 10 functions according to the prior art except as described herein, and components that perform prior art functions are not shown. The host 11 can be any type of computer and can communicate with the device by any means including through a network. Multiple hosts can also communicate with the device using prior art techniques. The host 11 sends read and write commands that reference standard logical block addresses (LBAs) that are processed by Command Interface 17. The host allows one or more users (or end-users) to store and retrieve data from the device. In an SMR drive according to an embodiment of the invention an LBA can be assigned to an E-region, an I-region, or Write-twice Cache region which must be dynamically tracked by the Address Indirection System 16.

Thin films 12 are continuous, prior art magnetic thin film coatings, which typically are deposited on both upper and lower surfaces of one or more hard disks 20 which are mounted on a rotating spindle (not shown). The films 12 are shown in FIG. 1 in cross section view. In a plan view, the regions are a plurality of concentric circular bands of magnetic tracks. The tracks and regions are composed of magnetic domains that serve their indicated purpose by being written and read by the heads (not shown) and do not have a physical structure. The magnetic thin films are formatted for use in an SMR architecture and in this embodiment include E-region 16, I-regions 13, write cache regions 14 (also called write-twice cache regions), and guard bands 15. A device can also have multiple E-regions on a single disk surface.

The Address Indirection System 16 translates the LBAs from the host commands into device internal block address (IBA) which is ultimately mapped to a physical block addresses (PBAs) for use by the device. The internal block address (IBA) is similar to an PBA but the IBA skips over defective blocks and can be defined as:

IBA=PBA+(Total Defective PBAs Found Up To This PBA).

The Address Indirection System 16 can, for example, be implemented as a functional component in the controller portion (not shown) of the DSD 10. The Address Indirection System keeps track of where data for each host LBA is currently stored in the device's various regions (and disks). The current IBA, if one exists, that corresponds to an LBA is found by using standard techniques such as using one or more tables. In embodiments of the invention some LBAs that are assigned to the device will not have assigned IBAs until needed as described below.

Write-twice cache regions (WTC-regions) 14 are relatively small bands of tracks (generally located between I-regions) that are used for write caching or other opportunistic data storage. The WTC-regions are described more fully in the application listed in the Related Applications section above. In devices with WTC-regions user-data can be temporarily written to WTC-regions first for nonvolatile caching, then later moved to either an E-region or I-region. Writing within each WTC-region can be shingled or unshingled. WTC-regions and I-regions are set up in an alternating series interrupted occasionally by E-regions (e.g., there can be roughly equal numbers of WTC-regions and I-regions, but there are typically a lesser number of E-regions). When write-caching user-data to a WTC-region, the nearest WTC-region is preferably used, regardless of where the data will be eventually written. The nearest write-twice cache is used to record new data when RAM write caching is disabled. The nearest WTC-region is defined as the one with shortest seek time, which can be on different disk-media surface.

Figure 2:
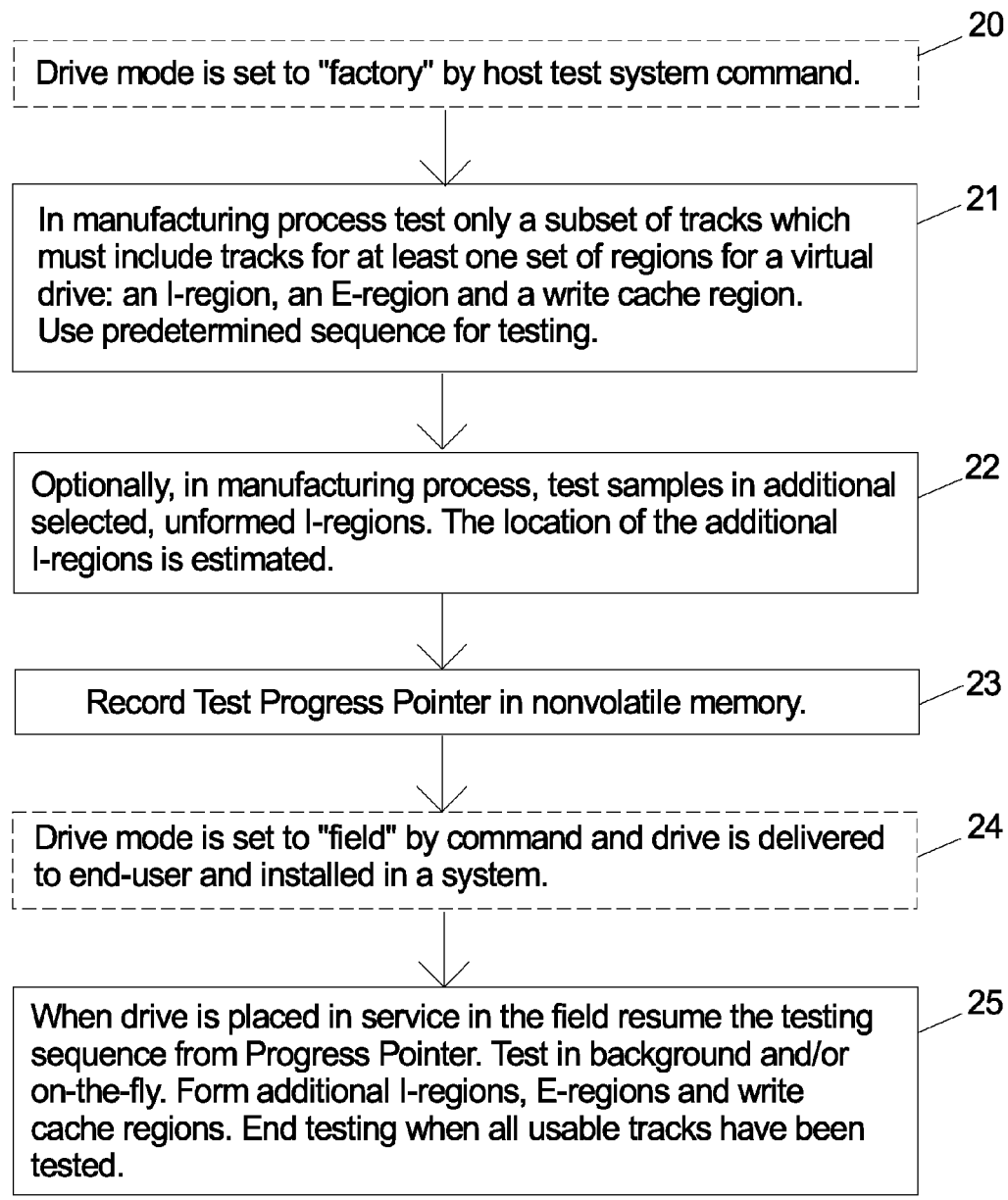
FIG. 2 is a flowchart illustrating steps in a method of operating a data storage device according to an embodiment of the invention.

FIG. 2 is a flowchart illustrating steps in a method of operating a data storage device according to an embodiment of the invention. The dashed line blocks indicate external actions that affect the device. The self-testing by the device is divided into a factory phases and a field phase. Any means of establishing or communicating which of these two phases the device should execute can be employed. In this embodiment the factory test phase is established by a host test system command to the firmware to set a specific mode parameter to the "factory" mode 20. The mode is then set to "field" before the drive is shipped 24. The Test Control System 18 according to the invention executes the required tests in a predetermined sequence 21 and records the progress in Test Progress Pointer 19 which is stored in nonvolatile memory 23. The optional sampling of additional tracks in as yet unformed I-regions 22 will be discussed further below. The Test Control System performs the factory testing and the field testing. The drive is presumably shipped or otherwise transported from the manufacturing line to a location where it is installed in a system where an end-user or host has access to the device 24. The system in which the drive is finally installed can be, for example, a personal computer, a disk array, a special purpose device, etc. without limitation. The Test Progress Pointer 19 allows the device's field test to resume testing where the factory test ended 25. The granularity of the testing progress is by track. Because the testing sequence of tracks is preferably predetermined, then only log2 (total number of tracks) bits are required to determine the progress point of testing. Note that the results of the test, the identity of defective sectors or PBAs in each track, can be recorded separately using prior art methods. The IBA:PBA mapping inherently identifies the defective PBAs by skipping over them.

In the embodiment of FIG. 1, testing at the factory has already been performed and included all of the I-regions 13, the E-region 16 and write twice cache areas 14. The tested regions form a fully functional virtual drive and can be used to read and write user data. In contrast, the I-regions 13A, the E-region 16A and write twice cache areas 14A have not been tested at this stage and therefore, do not contain any user data. The untested regions could be in media on the same disk media surface as the tested regions or a different disk surface. The relative numbers of the various regions can vary in embodiments.

The reduced factory testing time in embodiments of the invention saves manufacturing costs. It is reasonable to expect to at least a 50% reduction in the time spent in factory testing. Even lower testing amounts may be feasible, but at some point the risk of increased field failures becomes non-negligible. The testing described herein can be standard defect tests for magnetic media which include writing and reading multiple patterns. For example, a typical test can require about ten disk revolutions to perform the required writes and reads to test for defects.

Factory Testing

The tracks to be tested are first formatted as required. Formatting is a separate process from testing as used herein. In the embodiment described the disks are only partly formatted and partly tested when shipped to a customer. The drive completes the formatting and testing when installed in a system by a user. The stage of testing of the tracks is recorded in nonvolatile memory labeled Test Progress Pointer 19 in FIG. 1.

The factory testing must include at least one operational set of regions for the SMR architecture. In the described embodiment an operational set of regions includes an I-region, an E-region and a write twice cache (WTC) region. The operational set of regions works as a separate self-contained virtual disk drive and can be used immediately without further testing. The remaining other areas on the media can be formatted and tested in the field as described below. Alternative embodiments can include factory testing all the E-regions and write twice cache areas at least on one side of a disk surface. The information on the regions tested at the factory should be known by the drive for subsequent use in the field testing.

In one embodiment some of the I-regions are only partially tested on at least one disk surface while the E-regions and WTC-regions are fully tested. In the addition to the I-regions that are fully tested, the additional I-regions are sampled 22. Because the actual additional I-regions have not been formed, their location is estimated based on the assigned number of tracks and an assumed over-provisioning of PBAs to allow for defects, as will be further discussed below. The number of samples can be determined as follows. The first p % of each I-region is tested and p % declines systematically as testing proceeds. For example, the index of the I-region can be used to determine the p % with p % decreasing as the index increases. In addition, a selected sample set of tracks distributed across the I-region can be tested to gather more precise information about the defect density in each region. Whenever a defect is found within one of the tested tracks, the neighboring tracks should also be tested to determine the extent of the defect. Note that testing of neighboring tracks can result in additional tracks being tested that are not in the predetermined sequence and, therefore, these tracks may be retested during the field test.

Note that for all the I-regions that end up being completely tested. (i.e. all of them except possibly the very last one before the target test limit) the complete mapping for all IBAs up to this limit will be known to the firmware, and no over-provisioning is needed.

The factory testing should be designed to provide the defect distribution information necessary to calculate the amount of over-provisioning required for each I-region that will formed in the field by the drive such that a low probability of the drive failing in the field due to a lack of available space. Once the testing of all selected tracks in the samples is finished, the drive recursively estimates the starting locations of each of the I-regions, starting from the first one beyond the end of the fully tested area. The drive uses as an estimate of the maximum possible defect density for the I-region, the sum of the sampled defect density (from the sample track testing) and a value for the maximum underestimation for the drive population for this sampled defect density. The function notation $E(x)$ is the maximum underestimation of a specific I-region sampled defect density x. If the I-region i with sampled defect density x is known to start at IBA L, the end of the I-region will be:

$$L+R+E(x)*R$$

where R is the predetermined number of IBAs in an I-region.

This method is applied recursively until all I-regions for the device have been mapped. By using this method, even though the actual offset of each IBA within an I-region is not yet known, the offset of the first IBA in the I-region actually is known. This ensures that no existing IBA will require moving around when defects are detected later on. The extra PBAs (i.e. the over-provisioned PBAs that are not needed after an I-region has been fully tested and all defective PBAs have been found) are added to defect list and are skipped over in the IBA:PBA mapping.

Note: even though defects are actually detected by the uniform sampling and their presence is recorded, those defects are not individually taken into account when building the IBA:PBA mapping at this point. They are only used in aggregate as defect density.

Field Self-Run Self-Test (SRST)

The field self-run self-test (SRST) according to the invention can be implemented in alternative embodiments described below. Embodiments include testing by a background task and "on-the-fly" testing. In addition an embodiment using a sequential bypass parameter for "on-the-fly" testing will be described. Alternative embodiments will generally be implemented by changes in programming code contained in the drive's firmware which is executed by a microprocessor included in the drive's electronics.

In one embodiment the additional testing is performed by a background task in the drive's firmware once the drive is in use in the field. Whenever idle time is detected by the drive, the field test process can progress linearly from the last tested track. The set of tracks previously tested at the factory is known by the drive as described above. As this process progresses, any track that has already been tested can safely be skipped by the process.

During the factory testing as well as the field testing, as the tracks in I-regions are linearly tested, the pool of PBAs expands for mapping LBAs. PBAs with defects are skipped in the mapping process. A prior art method of recording defects can be used. In one embodiment the defects are skipped over by using an intermediate block address (IBA) which is the PBA adjusted by adding the total defects up to this address. As LBAs are written by the user the LBA:IBA mapping is updated in the Address Indirection System. Whenever a defect is found, IBAs in the I-region get pushed further out, but when over-provisioning is used IBAs in the next I-region are not impacted because of the previously allocated extra tracks. If over-provisioning is too large, then some sectors that are valid end up being marked as defective because they are not used. If the over-provisioning is not sufficient, the E-Region may be used as a last resort location for storing a specific LBA.

In the "on-the-fly" embodiment testing performed in specific non-tested regions the very first time data is written to the specific non-tested regions. It should be noted that testing for defects can take about ten disk revolutions to complete. I-tracks are written sequentially regardless of whether they have been pre-tested. If testing was not previously performed on an I-region, then the testing is performed as part of the data writing process request, which will result in slower writing the first time. But this field test is efficient because I-regions are written sequentially. This embodiment is potentially simpler because no background testing algorithms are needed and defect detection is done in real time. In an alternative embodiment new writes can be initially written in previously tested E-region if no previously scanned I-region is available. The LBAs in the E-region will then be moved to a I-region at a later time after an I-region becomes available. In this embodiment the E-region is used for more than just exceptions.

In an alternative embodiment, in order to mitigate the performance reduction for "on-the-fly" testing, the system can anticipate writes as an I-region is filling up and pre-test tracks ahead of the current writing position. The rate of pre-testing can be accelerated as the writing in I-region get closer to the end. One way to so this is to initially pre-test a track for each N accesses, then go to N/2, etc. as the I-region fills up.

Sequential Bypass Option

In an alternative embodiment the Test Control system references a set of sequential bypass parameters or flags for selected I-regions in an on-the-fly testing embodiment. These flags are set by the drive, not by the user. The effect of this parameter for the corresponding I-regions is as follows. If sequential bypass is enabled, then data can be written directly to an I-region in any location where it would not overwrite data. Optionally this might be a partially tested I-region. In this case no on-the-fly testing will be performed if previously tested IBAs in an I-track are available. A faster response to the user may be obtained for the write operation with sequential bypass, but the benefits of sequential writing of the host LBAs is lost. If sequential bypass is not enabled, then data first goes to the E-region. When the data needs to be de-staged from the E-region to an I-region, either the next tracks have already been tested, in which case no testing is needed, or they have not, in which case on-the-fly testing is done.

This ends the Detailed Description of the Invention.

The invention claimed is:

1. A method of operating a shingled magnetic recording drive comprising:
   as a part of the manufacturing process, testing a first subset of tracks in the drive, while leaving a second subset of tracks untested, the testing including multiple writing and reading operations, the first subset of tracks including tracks forming a first I-region, a first E-region and a first write cache region which further form a functional virtual drive usable for data storage by a user; and
   when the drive is used by the user, testing the second subset of tracks and forming additional I-regions, E-regions and write cache regions for use by the user from the second subset of tracks after testing.

2. The method of claim 1 wherein testing the second subset of tracks is performed as a background task.

3. The method of claim 1 wherein testing the second subset of tracks includes testing performed on-the-fly.

4. The method of claim 3 enabling sequential bypass for selected I-regions that bypasses on-the-fly testing by diverting a new sequential write for a selected I-region to a previously tested track in a different I-region.

5. The method of claim 3 further including selectively allowing new writes, which would otherwise require on-the-fly testing of a target track in an I-region, to be written to an E-region.

6. The method of claim 1 wherein testing the first subset of tracks further comprises testing tracks in a predetermined sequence and recording a first ending point in the sequence in nonvolatile memory; and wherein testing the second subset of tracks further comprises resuming testing tracks in the predetermined sequence from the first ending point in the sequence recorded in nonvolatile memory.

7. The method of claim 1 wherein the first subset of tracks includes selected sample tracks assigned to selected additional I-regions that will be formed when the drive is used by the user.

8. The method of claim 7 wherein the selected sample tracks vary systematically in number from one selected additional I-region to a next selected additional I-region.

9. The method of claim 7 further comprising: after finding a defect within one of the selected sample tracks, determining the extent of the defect by testing tracks adjacent to the track with the defect.

10. The method of claim 7 further comprising: as a part of the manufacturing process, determining locations of the additional I-regions by adding over-provisioned tracks which allow for skipping defective blocks in each additional I-region without affecting a starting location of a subsequent additional I-region.

11. A shingled magnetic recording drive comprising:
   a test control system which as a part of the manufacturing process, tests a first subset of tracks in the drive in a predetermined sequence, while leaving a second subset of tracks untested, the testing including multiple writing and reading operations, the first subset of tracks including tracks forming a first I-region, a first E-region and a first write cache region which further form a functional virtual drive usable for data storage by a user;
   a test progress pointer which identifies a point in the predetermined sequence where the test control system stopped as a part of the manufacturing process;
   a first area of thin film magnetic media containing the first I-region, a first E-region and a first write cache region; and
   a second area of thin film magnetic media containing the second subset of tracks which are untested when the manufacturing process ends.

12. The shingled magnetic recording drive of claim 11 wherein the test control system begins testing the second subset of tracks after the drive is installed in a user's system.

13. The shingled magnetic recording drive of claim 12 wherein the test control system testing the second subset of tracks is performed as a background task.

14. The shingled magnetic recording drive of claim 12 wherein the test control system testing the second subset of tracks includes testing performed on-the-fly.

15. The shingled magnetic recording drive of claim 14 wherein the test control system performs sequential bypass for selected I-regions by bypassing on-the-fly testing by diverting a new sequential write for a selected I-region to a previously tested track in a different I-region.

16. The shingled magnetic recording drive of claim 14 wherein the test control system selectively allows new writes, which would otherwise require on-the-fly testing of a target track in an I-region, to be written to an E-region.

17. The shingled magnetic recording drive of claim 11 wherein the first subset of tracks includes selected sample tracks assigned to selected I-regions other than the first I-region.

18. The shingled magnetic recording drive of claim 17 wherein the selected sample tracks vary systematically in number from one selected I-region to a next selected I-region.

19. The shingled magnetic recording drive of claim 17 wherein the test control system, after finding a defect within one of the selected sample tracks, determines the extent of the defect by testing tracks adjacent to the track with the defect.

* * * * *